Patented Feb. 4, 1930

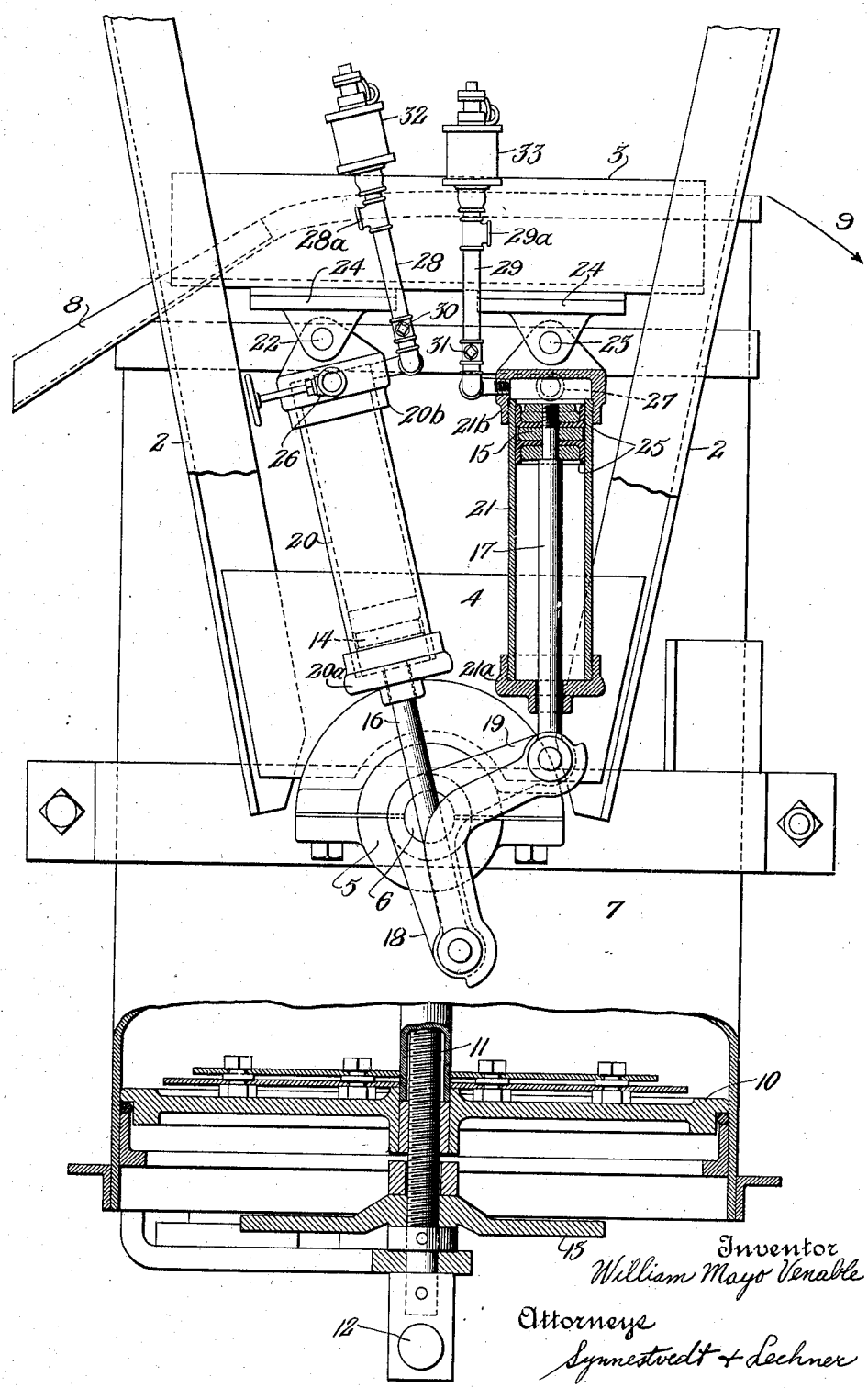

1,745,777

UNITED STATES PATENT OFFICE

WILLIAM MAYO VENABLE, OF PITTSBURGH, PENNSYLVANIA, ASSIGNOR TO BLAW-KNOX COMPANY, OF PITTSBURGH, PENNSYLVANIA, A CORPORATION OF NEW JERSEY

MEASURING AND DUMPING APPARATUS

Application filed June 20, 1927. Serial No. 200,270.

This invention relates to measuring and dumping apparatus suitable for use in the handling of bulk materials, for example the materials employed in the making of concrete or the like, and more particularly to shock absorbing mechanism for such apparatus.

While the invention may be employed to advantage in association with apparatus of various kinds where heavy thrusts or shocks occur upon the movement of loaded containers or other heavy parts, it is especially useful (and will therefore be herein described) as applied to a measuring and dumping container of the character illustrated in my co-pending application, Serial No. 146,909, filed November 8th, 1926, for measuring apparatus.

In connection with the measurement of materials for mixing concrete and the like, it has been found to be not only very convenient to mount beneath the supply bins a measuring apparatus capable of being filled from said bins and dumped into a mixer or conveyor, but also very advantageous in that the materials may be accurately measured thereby, for each batch, so that the proportions of the materials in the concrete will be maintained uniform. These advantages particularly accrue when the sand and water are measured together, the sand in the measuring container being completely saturated with water, for measurement in this way insures accuracy in the amounts of sand and water, which are ordinarily the two most variable constituents of a concrete mix owing primarily to the fact that perfectly dry sand is seldom obtained in practice, and moisture present in the sand in varying degrees causes it to pack differently and also renders uncertain the total quantity of water in the mix.

For the measurement of sand and water in the manner above-indicated, it is of advantage to have the measuring container variable as to volume, and pivotally mounted so that it may be readily and quickly dumped, and in my aforementioned co-pending application I have illustrated such an adjustable measuring container pivoted at a point which is above its center of gravity when empty and below its center of gravity when loaded so that it will dump and right itself by gravity. In such dumping and righting, shocks and stresses are set up which vary according to changes in the adjustment of the volume of the container and differences in the relative positions of the pivot and the center of gravity of the container. In installations of large size, for example where the container is of one or one and a half yards capacity, these shocks may be quite severe.

One of the primary objects of the present invention is to counteract and cushion shocks in apparatus such as that outlined above, and in general to overcome the disadvantages there pointed out.

More specifically it is an object of the invention to provide shock absorbing means, on apparatus of the character described, which shall be capable of ready adjustment in proportion to the shock which it has from time to time to counteract, and which shall be simple and rugged in construction, easy of application to existing equipment, and not subject to clogging or great wear from the materials or gritty matter met with in practice.

How these, and other objects and advantages which are incident to my invention or which may occur to those skilled in the art, are obtained, will be clear from the following description taken together with the accompanying drawing which illustrates a convenient embodiment of the invention.

The figure is a side elevation of a pivoted measuring and dumping container with the apparatus of the present invention applied thereto, certain parts being broken away and certain parts being shown in section.

Referring now to the drawing, I have therein shown a supporting structure or frame having side members 2 and cross members 3, 4, on the latter of which is a bearing 5 in which the pivot shaft or pin 6 of the measuring and dumping container 7 is mounted for rotation, it being understood that there is a similar frame structure and bearing on the other side of the container 7. The frame members 2 may be hung from a material supply bin (not shown) located above the container or receptacle 7. The container may be of any desired type, since it is not per se a part of the present invention, the one illustrated being similar to that shown in my aforementioned co-pending application. It is open at the top for loading, and may have an overflow spout or lip 8 to carry off surplus water when sand and water are being measured together. The pivot pins 6, on either side, are located below its center of gravity when loaded and above its center of gravity when empty, so that it will dump and return to filling position by gravity, the arrow 9 indicating the direction of rotation for dumping. Suitable latches (not shown) may be provided for holding it in either position. The container may be of fixed volume, or its capacity may be varied in any preferred manner, as by the insertion therein of anything which will fill a part of the space, or by providing it with an adjustable bottom. I have here shown such an adjustable bottom 10 which may be moved up or down on the threaded rod 11 by rotation of the same by means of a handle 12 and a locking wing-nut 13, but I will not here describe such construction and its operation in detail since it properly forms a part of my said co-pending application to which reference may be had if desired.

For the cushioning or absorbing of the shocks incident to the dumping and righting of such a container I have provided a pair of pistons 14, 15, connected by rods 16, 17, to arms 18, 19, of a double crank fixed on the rotatable pivot pin 6, said pistons operating in cylinders 20, 21, pivotally mounted at 22, 23, on the frame member 3 or, as here shown, on brackets 24 attached to said frame member.

The cylinder ends 20$^a$, 21$^a$, have holes for the piston rods 16, 17, of such size that sufficient clearance is provided to prevent pressure from building up behind the pistons. The cylinder heads 20$^b$ and 21$^b$ are provided, respectively, with adjustable needle valves 26 and 27 for controllably relieving the pressure in front of the pistons as they move upward, and with intake pipes 28, 29, and check valves 30, 31, respectively, through which air may be admitted into the cylinders as the pistons move downward.

Each piston, to insure a close fit in its cylinder, is provided with a pair of cup leathers 25, and the intake pipes, above their air-inlet openings 28$^a$ and 29$^a$, may be equipped with regulable lubricators 32 and 33, respectively, to lubricate the pistons and their leathers 25. These lubricators may be of any suitable and conveniently available type, for example such as will feed the oil by drops at periodic intervals. I have found that upon proper adjustment of the lubricators, the air drawn through the inlet pipes 28, 29, into the cylinders, will carry in oil and cause not only proper lubrication of the cylinders, but will also cause a film of oil to form on the piston heads which collects any dirt carried in such as cement dust which is often present in the air where this type of apparatus is used, and thereby prevents excessive wear on the cup leathers 25 by such dust and dirt.

It will be seen that, in operation, the two air-cushion means, each including a piston and a cylinder with its appurtenant parts act in alternation. When the tank or receptacle 7 turns down from its filling position (the position shown in the figure) to its dumping position, the crank-arm 18 and rod 16 move the piston 14 toward the cylinder-head 20$^b$, compressing the air in cylinder 20, check valve 30 preventing exhaust of the air and adjustable needle valve 26 permitting the escape thereof more or less gradually according to the adjustment, while a vacuum is prevented from being created beneath the piston by virtue of the clearance between rod 16 and cylinder cap 20$^a$. At the same time crank-arm 19 and rod 17 are drawing piston 15 away from cylinder head 21$^b$ thereby causing air to flow into cylinder 21 through port 29$^a$, pipe 29 and check valve 31, the proper amount of oil being drawn in, with such air, from the adjustable lubricator 33, and the air below the piston 15 having free outlet through the clearance space between rod 17 and cylinder cap 21$^a$. As the container rights itself, under the influence of gravity, exactly the reverse operation takes place. Therefore, during rotation in one direction one cylinder is controlling the movement and the other is taking in air and lubricant, and during rotation in the opposite direction, the other cylinder is controlling and the first cylinder taking in its air.

Obviously the separate adjustment means for the two air exhausts, and for the two lubricators, permits of proper compensation for the work to be done on the dumping and return strokes. Furthermore, adjustability of the needle valves is of advantage not only for regulation as between movement of the container while empty and while loaded but also as between differences both in the loading and in the position of the center of gravity when the volume of the container is altered either by the movable bottom 10 shown or by any other means.

In this connection it should be noted that the mere shift in position of such bottom alters such center of gravity aside from any alteration caused thereby in the amount of the charge being measured. Furthermore the net change in position of the center of gravity when loaded, due to the combination of the shift in the position of the bottom and the difference in amount of the load, is different from the net change where the alteration is made by using a fixed bottom and inserting a filler of wood or some light false bottom. In the former case, a reduction in the capacity of the container would raise the center of gravity of the loaded container, and in the latter case such a reduction in capacity would lower it.

It is clear from the foregoing that the apparatus of my invention makes possible proper control of the movement and cushioning of the shock of the measuring container under all conditions encountered, that the device is simple of operation, easily and cheaply installed, and not subject to excessive wear even when used under conditions where the air is laden with dust. Obviously the device may be applied to other mechanisms and devices without departing from the scope of the invention.

What I claim is:—

1. In apparatus of the character described, a member movable in two directions by gravity, and a pair of shock-absorbing cylinders with pistons operable by said member and each adapted to draw in and compress air during said two movements, respectively, in alternation, together with an independent check-valve for each cylinder permitting free drawing-in of the air.

2. In apparatus of the character described, a member movable in two directions, and a pair of independently operating shock-absorbing cylinders with pistons operable by said member and each adapted to draw in and compress air during said two movements, respectively, in alternation, together with separately regulable air escape means for each cylinder.

3. The combination, with a container pivotally mounted for movement between filling and dumping positions, of separate air-cushion means for its opposite movements each of which is non-cushioning during the operation of the other.

4. The combination, with a container pivotally mounted for movement between filling and dumping positions, of independently operating air-cushion means for its opposite movements each of which is separately adjustable.

5. In combination with a movable material handling container, means controlling its movement in one direction, independently operating means controlling its movement in the opposite direction, and separate adjustment means for each of said means.

6. The combination of a movable material handling container, means for adjusting its capacity, means controlling its movement in one direction, other means controlling its movement in the opposite direction, each of said means being alternately inoperative during one of said two movements, and separate means for adjusting each of said controlling means in accordance with changes in the force of the container's movement resulting from changes in its capacity and consequent loading.

7. The combination of a movable material handling container, having an adjustable bottom, separate means controlling the movement of the container in opposite directions, and independent adjusting means for said controlling means.

8. The combination of a pivoted material handling container movable between positions of dumping and filling, means for altering its effective volumetric capacity, separate means controlling the movement thereof to its dumping and filling positions, and means for independently adjusting said controlling means.

9. The combination of a pivoted material handling container movable between positions of dumping and filling, means for altering its effective volumetric capacity, separate means controlling the movement thereof to its dumping and filling positions, and means for independently adjusting said controlling means to compensate for differences in thrust due to alterations of the capacity of the container.

10. The combination of a pivoted material handling container movable between positions of dumping and filling, means for altering its effective volumetric capacity, separate means controlling the movement thereof to its dumping and filling positions, and means for independently adjusting said controlling means to compensate for differences in thrust due to alterations in the position of the center of gravity of the container resulting from adjustment of the means for altering its volumetric capacity.

11. In measuring and dumping apparatus, a pivoted movable container, supporting means therefor, and means mounted on the supporting means for cushioning the movement of the container, including a pair of cylinders having restricted outlet ports, and pistons, operable by the container in moving, to reciprocate in said cylinders, together with unrestricted air-inlet ports to said cylinders and check valves preventing the exhaust of air through the inlet ports.

12. In measuring and dumping apparatus, a pivoted movable container, supporting means therefor, and means mounted on the supporting means for cushioning the movement of the container, including a pair of cylinders having restricted outlet ports, and pistons, operable by the container in moving, to reciprocate in said cylinders, together with unrestricted air-inlet ports to said cylinders and lubricating means delivering to the inlet ports.

13. In measuring and dumping apparatus, a pivoted movable container, supporting means therefor, and means mounted on the supporting means for cushioning the movement of the container, including a pair of cylinders having restricted outlet ports, and pistons, operable by the container in moving, to reciprocate in said cylinders, together with unrestricted air-inlet ports to said cylinders and separately regulable lubricators for the cylinders.

14. In measuring and dumping apparatus, a pivoted movable container, supporting means therefor, and means mounted on the supporting means for cushioning the movement of the container, including a pair of cylinders having restricted outlet ports, and pistons, operable by the container in moving, to reciprocate in said cylinders, said restricted outlet ports being separately adjustable as to capacity and said cylinders having means rendering either inoperative when the other is operating.

15. In combination, a movable container, a pivot pin therefor, a supporting structure on which said container is pivoted, a double-armed crank on said pin, a pair of cylinders mounted on said structure, and a pair of pistons each operating in a cylinder and actuated by an arm of said crank.

16. In combination, a movable container, a pivot pin therefor, a supporting structure on which said container is pivoted, a double-armed crank on said pin, a pair of cylinders mounted on said structure, and a pair of pistons each operating in a cylinder and actuated by an arm of said crank, together with pressure relief means for said cylinders.

17. In combination, a movable container, a pivot pin therefor, a supporting structure on which said container is pivoted, a double-armed crank on said pin, a pair of cylinders mounted on said structure, and a pair of pistons each operating in a cylinder and actuated by an arm of said crank, together with separately-adjustable pressure-relief means for each cylinder.

18. In combination, a movable container, a pivot pin therefor, a supporting structure on which said container is pivoted, a double-armed crank on said pin, a pair of cylinders mounted on said structure, and a pair of pistons each operating in a cylinder and actuated by an arm of said crank, said cylinders each having means to prevent building up of pressure in one end thereof.

19. In combination, a movable container, a pivot pin therefor, a supporting structure on which said container is pivoted, a double-armed crank on said pin, a pair of cylinders mounted on said structure, and a pair of pistons each operating in a cylinder and actuated by an arm of said crank, said cylinders each having means to prevent building up of pressure in one end thereof and pressure-regulating means at the other end thereof.

20. In combination, a movable container, a pivot pin therefor, a supporting structure on which said container is pivoted, a double-armed crank on said pin, a pair of cylinders mounted on said structure, and a pair of pistons each operating in a cylinder and actuated by an arm of said crank, said cylinders each having means to prevent building up of pressure in one end thereof and separately adjustable pressure-regulating means at the other end thereof.

21. In combination, a movable container, a pivot pin therefor, a supporting structure on which said container is pivoted, a double-armed crank on said pin, a pair of cylinders mounted on said structure, and a pair of pistons each operating in a cylinder and actuated by an arm of said crank, said cylinders each having means to prevent building up of pressure in one end thereof and having at the other end thereof open air admission means and restricted air outlet means.

22. In combination, a movable container, a pivot pin therefor, a supporting structure on which said container is pivoted, a double-armed crank on said pin, a pair of cylinders mounted on said structure, and a pair of pistons each operating in a cylinder and actuated by an arm of said crank, said cylinders each having means to prevent building up of pressure in one end thereof and having at the other end thereof open air admission means and adjustably-restricted air outlet means.

23. The combination, with a member rotatably movable in two directions, of a pair of separately pivotally mounted cushioning devices for the two movements thereof, each of said devices having a crank-arm connection to said member and being adapted to act upon said member to cushion its movement in one direction and being acted upon by said member during the opposite movement to place it in condition for cushioning.

24. The combination, with a container rotatably movable by gravity in two directions, from filling to dumping position and vice versa, of a pair of cushioning devices, one for each movement thereof, each of said devices having means whereby it is put in condition for its cushioning action during the cushioning operation of the other by the gravitational movement of the container.

25. The combination, with a member rotatably movable in two directions, of a pair of cushioning devices, one for each movement thereof, each of said devices including a dashpot and having means whereby it is put in condition for its cushioning action during the cushioning operation of the other, together with an independent cushion adjuster for each device, one element of the dashpot of each device having a pivotal mounting and the other element having a crank-arm connection to said movable member.

In testimony whereof I have hereunto signed my name.

WILLIAM MAYO VENABLE.